United States Patent [19]
Beals

[11] Patent Number: 5,848,865
[45] Date of Patent: Dec. 15, 1998

[54] LADING TIE-DOWN STRAP PROTECTOR

[75] Inventor: Stephen H. Beals, Libertyville, Ill.

[73] Assignee: Ireco, Inc., Chicago, Ill.

[21] Appl. No.: 929,182

[22] Filed: Sep. 8, 1997

[51] Int. Cl.$^6$ ............................................. B60P 7/06
[52] U.S. Cl. ................................................. 410/99; 410/41
[58] Field of Search .................................. 410/99, 32, 41, 410/97, 155, 85, 36, 42; 24/115 R; 248/345.1, 499; 206/453, 586

[56] References Cited

U.S. PATENT DOCUMENTS

| | | | |
|---|---|---|---|
| 3,128,106 | 4/1964 | Zinkel, Jr. ................................. | 410/41 |
| 3,152,693 | 10/1964 | Anderson .............................. | 410/99 X |
| 3,378,889 | 4/1968 | Dunderdale ............................... | 410/99 |
| 4,525,113 | 6/1985 | Colman ..................................... | 410/41 |
| 4,765,479 | 8/1988 | Roberts .................................... | 206/453 |
| 4,938,357 | 7/1990 | Schmidt ................................... | 206/453 |
| 5,311,996 | 5/1994 | Duffy et al. ............................. | 206/453 |
| 5,340,250 | 8/1994 | Meriwether et al. ..................... | 410/99 |
| 5,385,236 | 1/1995 | Cowan et al. ................... | 248/345.1 X |
| 5,518,348 | 5/1996 | Tucker ...................................... | 410/99 |
| 5,584,623 | 12/1996 | Nadherny ................................. | 410/99 |

FOREIGN PATENT DOCUMENTS

573181-A2  12/1993  European Pat. Off. ............... 206/453

*Primary Examiner*—Stephen T. Gordon
*Attorney, Agent, or Firm*—Lockwood, Alex, FitzGibbon & Cummings

[57] ABSTRACT

A shield for attachment to and removal from a lading tie-down strap for shielding the strap from learing engagement with a corner of lading or cargo. The shield is preferably molded from a plastic material such as polyurethane and is in the form of a generally rectangular shaped pad. The pad has two end portions interconnected by a transverse live hinge area. Each end portion has an integrally formed raised flap extending transversely thereacross. One of the flaps is hinged adjacent one longitudinal edge of the tab while the other flap is hinged adjacent the opposite side or edge. The distal end of each flap has a hook formation on its underside which is open toward the proximal end of the flap. In use, a tie-down strap is inserted under the flaps which may be temporarily lifted to permit insertion. One edge of the tie-down strap will be inserted in one of the hooks while the opposite edge of the strap will be inserted in the hook of the other strap.

10 Claims, 5 Drawing Sheets

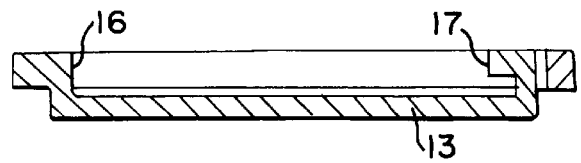
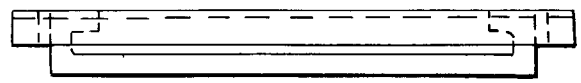
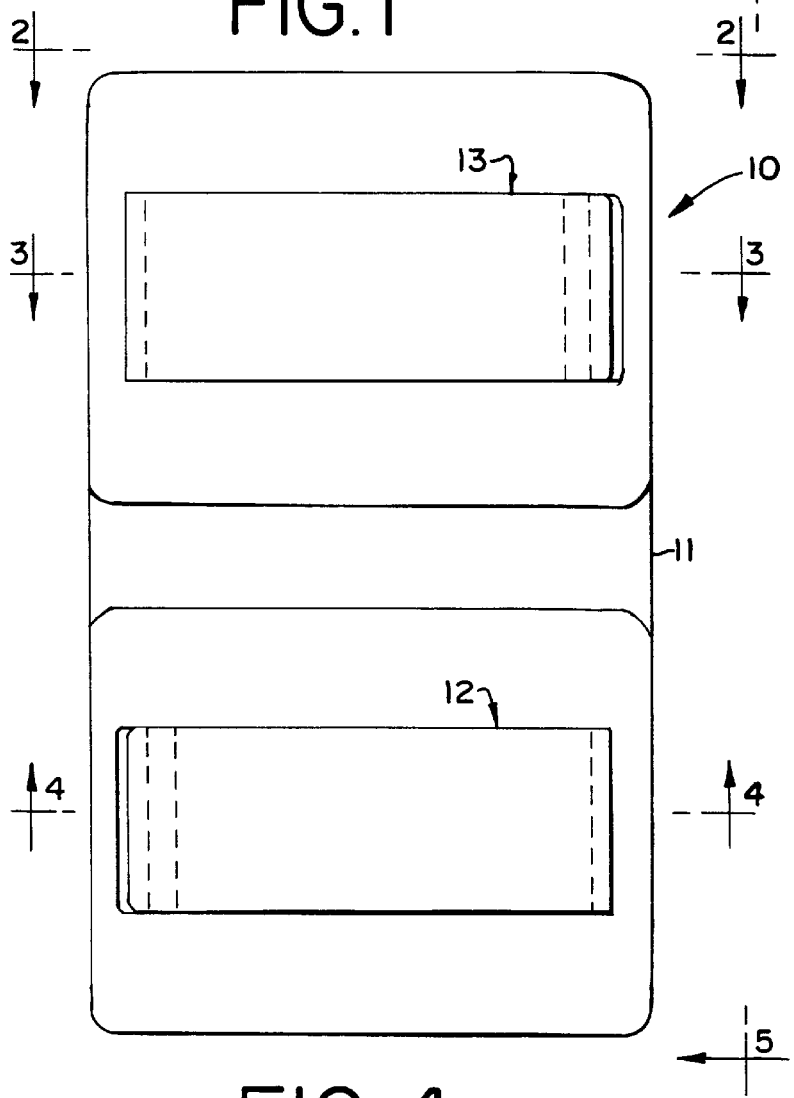
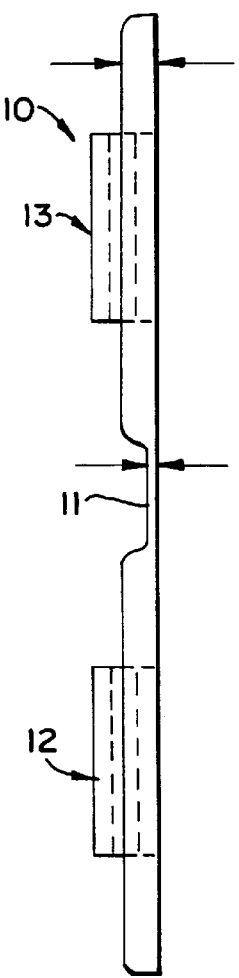
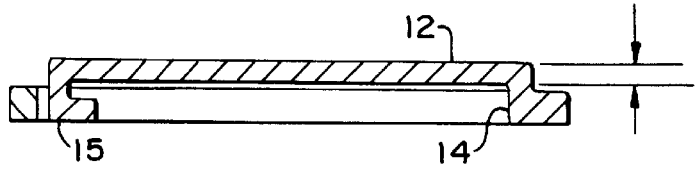

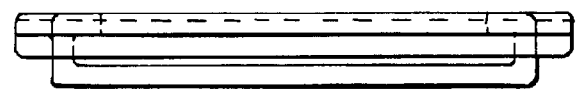
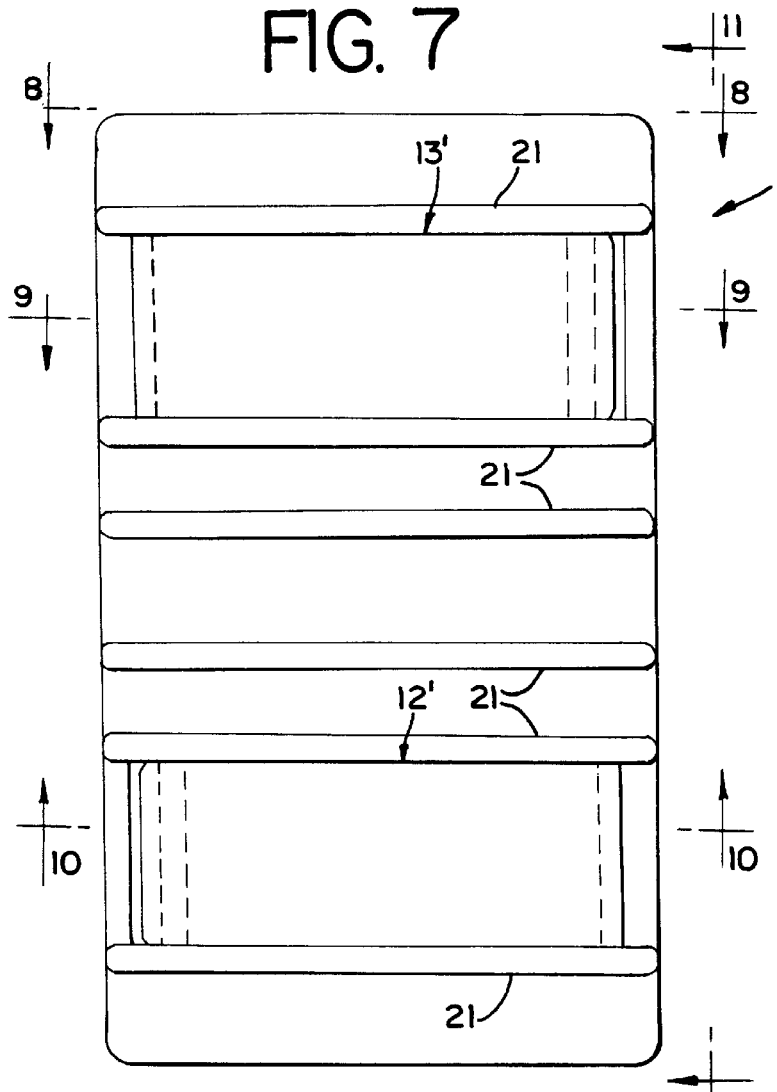
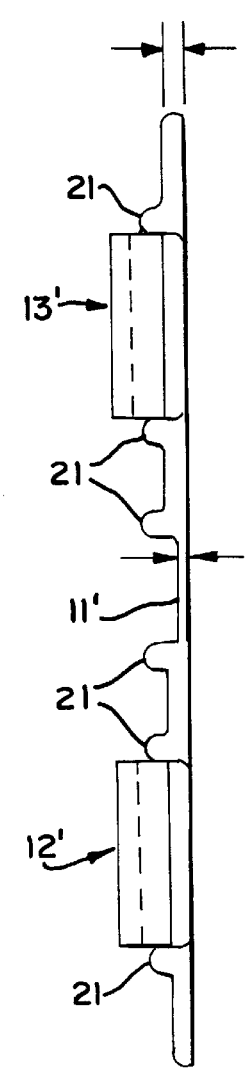
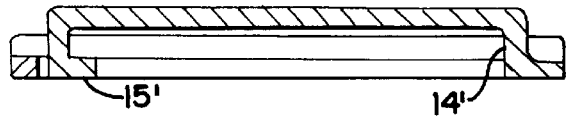

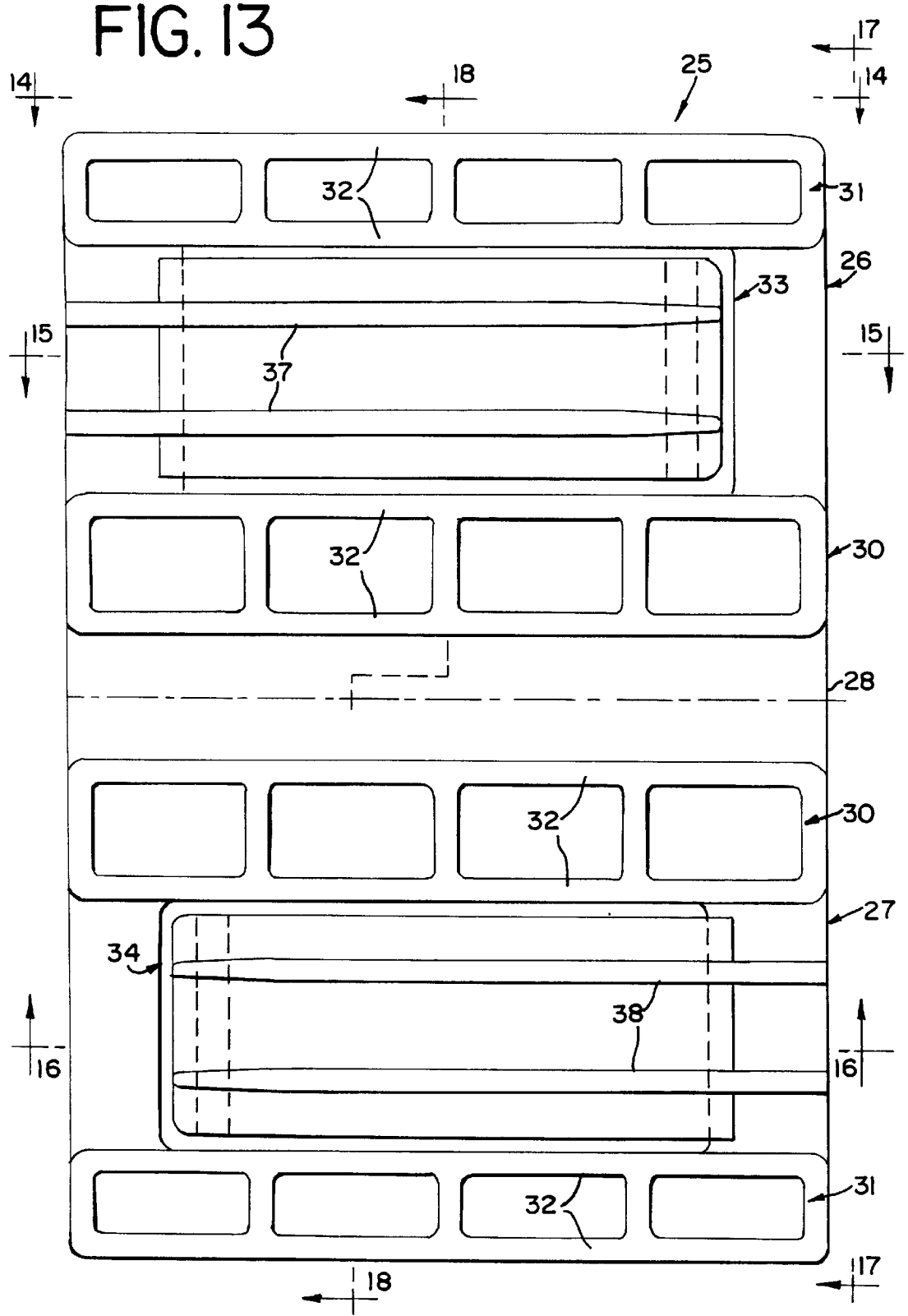

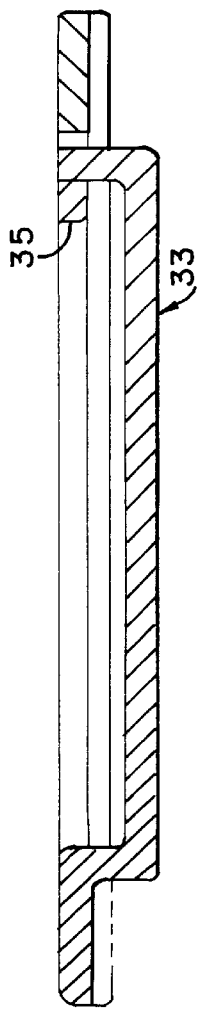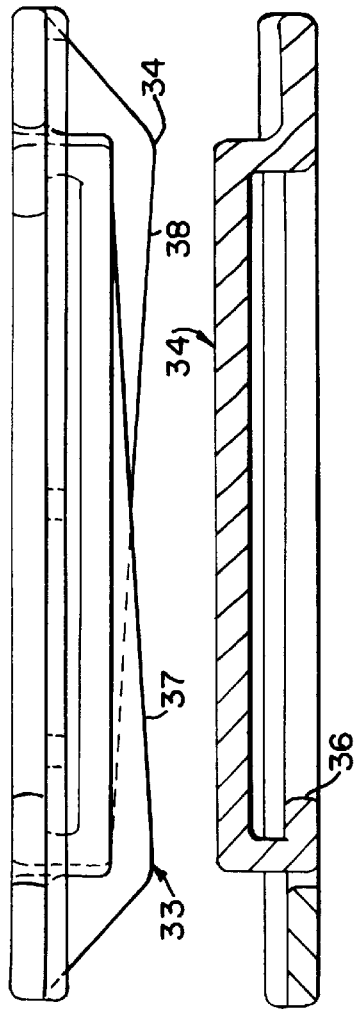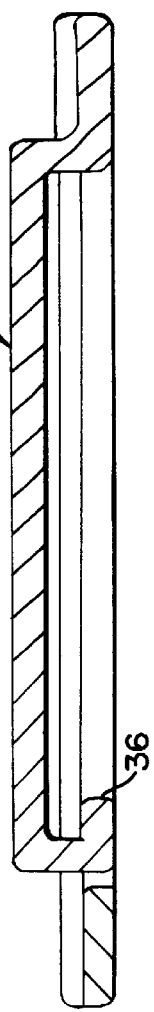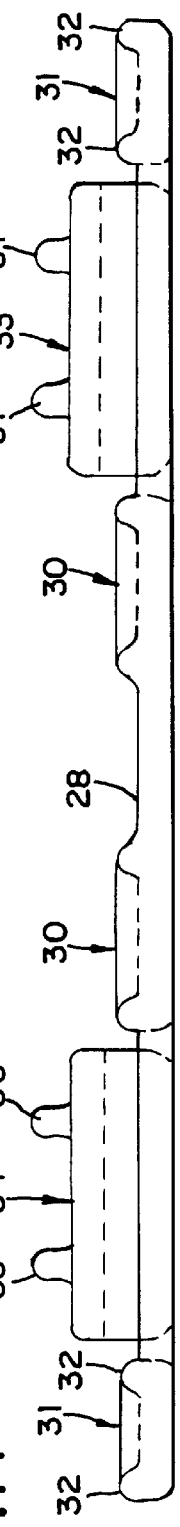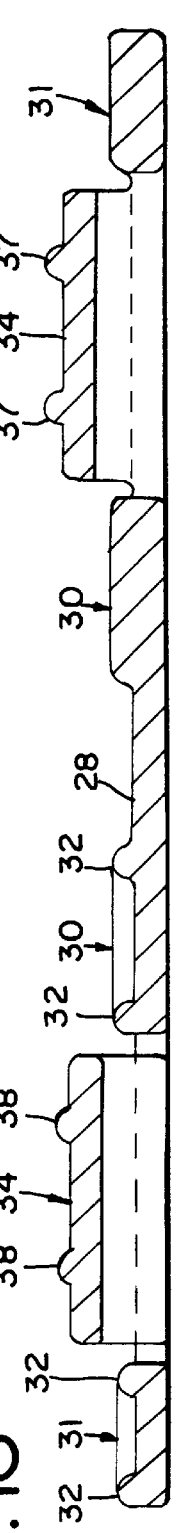
FIG. 15
FIG. 14
FIG. 16
FIG. 17
FIG. 18

LADING TIE-DOWN STRAP PROTECTOR

BACKGROUND AND DESCRIPTION OF THE INVENTION

This invention relates to a shield for ready attachment to and release from a lading or cargo tie-down strap for shielding the strap from wearing engagement with a variably shaped corner of a body of lading over which the strap passes. Depending upon the nature and content of the body of lading, the shape of the corner over which the tie-down web or strap passes may vary from a relatively sharp corner edge to a somewhat rounded or arcuate corner surface of appreciable arcuate length.

Tie-down straps formed of nylon or other material having comparable physical characteristics are in use for tying down lading or cargo on flatbed railway cars and trucks. When the cargo or lading is in the form of stacks of lumber having sharp corner edges, it has been the practice to use tie-down cables and provide corner edge protectors for the lumber so as to prevent the cables from engaging and injuring the edges of the pieces of lumber that form the corners of the body of lading or cargo. When the cargo or lading is other than lumber, such as lengths of pipe, rods, posts, etc. nylon tie-down straps are widely used instead of woven wire cables. Whereas, the corner edges of the cargo or lading need to be protected from engagement with tie-down cables that are drawn taut, when straps such as woven nylon are used for cargo or lading tie-down and drawn taut, the straps need to be protected from wearing engagement with the corners of the cargo or lading.

While the corners of bodies of lading or cargo on a flatbed of a rail car or other vehicle may have sharp corner edges, more often, the corners will be rounded or arcuate as in the case of plastic or metal pipe, tubing, rods, posts, etc. The diameters of the individual pieces of lading or cargo may vary from relatively small diameter rods and cable to large diameter pipes or tubing. Hence, shields for protecting the tie-down straps may needed to shield the tie-down straps from wear engagement with corners ranging from relatively sharp corner edges to arcuate corner surfaces of appreciable arcuate length.

In practical usage, the protective shields for lading tie-down straps of the present invention must be readily attached to and removed from a strap. However, when the shields are in place they should engage or grip the tie-down straps with sufficient force so as not to be loose on the straps and readily slidable thereon such as under the force of gravity. On the other hand, it is desirable that the shields be movable along the tie-down straps without the expenditure of excessive force to provide the sliding movement.

In view of the foregoing considerations, it will be seen that the object of the invention, generally stated, is the provision of inexpensive shields for ready attachment to and removable from lading tie-down straps formed of nylon webbing or other suitable materials and which will protect the webbing or strap material from wearing engagement with the corners of bodies of lading or cargo, the contours of such corners ranging from relatively sharp corner edges to rounded or arcuate taped corners of appreciable arcuate lengths.

For a more complete understanding of the nature and scope of the invention, reference may now be had to the following detailed description of two presently preferred embodiments taken in conjunction with the accompanying drawings in which:

BRIEF DESCRIPTION OF THE DRAWINGS

FIG. 1 is a plan view of a tie-down strap shield embodying the present invention;

FIG. 2 is an end view taken on line 2—2 of FIG. 1;

FIG. 3 is a sectional view taken on line 3—3 of FIG. 1;

FIG. 4 is a sectional view taken on line 4—4 of FIG. 1;

FIG. 5 is a side or edge elevational view taken on line 5—5 of FIG. 1;

FIG. 7 is a plan view of a shield for a lading tie-down strap forming a second embodiment of the invention;

FIG. 8 is an end elevational view taken on line 8—8 of FIG. 7;

FIG. 9 is a sectional view taken on line 9—9 of FIG. 7;

FIG. 10 is a cross sectional view taken on line 10—10 of FIG. 7;

FIG. 11 is a side or edge elevational view taken on line 11—11 of FIG. 7;

FIG. 13 is a plan view of a shield for a leading tie-down strap forming a third embodiment of the invention;

FIG. 14 is an elevational view taken on line 14—14 of FIG. 13;

FIG. 15 is a sectional view taken on line 15—15 of FIG. 13;

FIG. 16 is a sectional view taken on line 16—16 of FIG. 13;

FIG. 17 is a side elevational view taken on line 17—17 of FIG. 13;

FIG. 18 is a sectional view taken on line 18—18 of FIG. 13; and

Referring to FIG. 19, a bulkhead railway flat car is indicated therein generally at 5. The car 5 is shown loaded with lading in the form of stacked pipes or tubes tied down on both sides by a plurality of tie-down straps 7—7 which may be in the form of nylon webbing which is long lasting and durable under normal conditions of usage. Nylon webbing is a preferred material because it does not stretch appreciably under tension and is durable in use. The nylon webbing may be impregnated, coated or laminated with substances or materials which impart desired coefficients of friction or other desirable properties. The straps 7 can be formed of materials other than nylon or blends of nylon and other materials which give the straps desired properties.

In accordance with known practice ends of the tie-down straps 7 are shown are wound on winches 4—4 mounted in known manner on the sides of the car 5. When not in use with lading the tie-down straps 7 can remain attached when tightened sufficiently so that they will remain in place for subsequent use. As shown in FIG. 19, each of the lading tie-down straps 7 is provided with a shield 10 where a strap passes over a corner of the lading.

Referring to FIGS. 1–5, a shield of the present invention is indicated generally at 10 which may be injected molded or otherwise formed from a suitable plastic material such as polyurethane. The shield 10 is generally rectangular in shape and when used with nylon webbing tie-down straps having typically a width of 4 inches, the shield 10 will be in the form of a pad 6 inches wide and 9 inches long. Intermediate its opposite ends (midway as shown in FIG. 1) the shield 10 is formed with an integral section 11 which forms a so-called "live hinge". For example, the hinge 11 may have a thickness of 0.125 inch while the thickness of the shield 10 on opposite sides of the hinge 11 is 0.25 inch.

Figure 19:
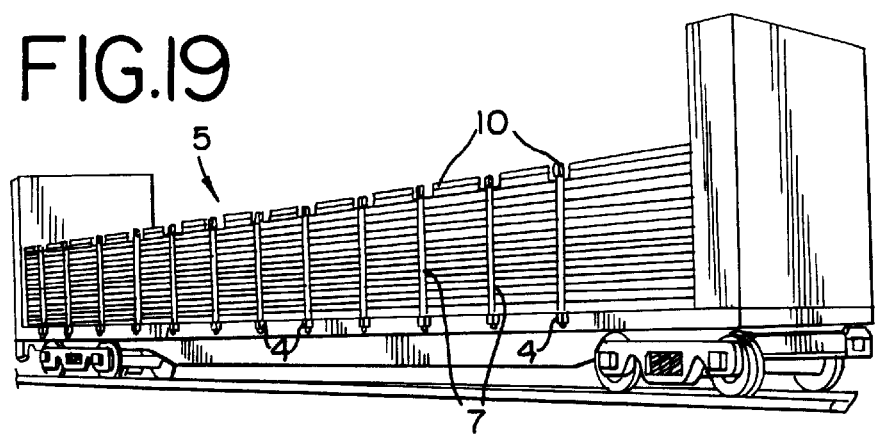
FIG. 19 is a perspective view of a bulkhead railway flatcar loaded with lading in the form of plastic or metal tubing and showing a primary use for the lading tie-down strap shields of the present invention.

The hinge area 11 divides the shield 10 into upper and lower halves which incorporate raised strap retaining flaps 12 and 13 which have the same construction except that flap 12 is hinged on the right and has a hook formation 15 on its distal end, while the flap 13 is hinged on the left and has a hook formation 17 on its distal end. The flaps 12 and 13 form channel shaped formations in transverse cross section as shown in FIGS. 3 and 4. The right-hand sidewall 14 of flap 12 is generally vertical as is also the left-hand sidewall 16 of flap 13. In use, each hook 15 and 17 is on the underside of the distal end of a flap and is open toward the proximal end of the flap. The shield has open window areas underneath the flaps 12 and 13.

The shield 10 is releasably attached to a lading tie-down strap by first raising one of the flaps 12 or 13 and inserting one of the edges of a strap into one of the hooks 15 or 17 and then raising the other flap and inserting the opposing edge of the strap into the other hook 15 or 17. In this way, the shield will be releasably attached to the strap in a sufficiently secure manner that it will not be dislodged or removed under ordinary circumstances except when the strap is forcibly removed from the shield 10 by lifting the flaps 12 and 13. Not only does the shield remain attached to the tie-down strap but when the strap has an appropriate thickness a shield 10 will not slide on the strap except when forced to do so. Thus, while the position of the shield 10 on a tie-down strap may be readily established as desired, the relative position will not ordinarily change except when forcibly manipulated to a different relative position.

Figure 6:
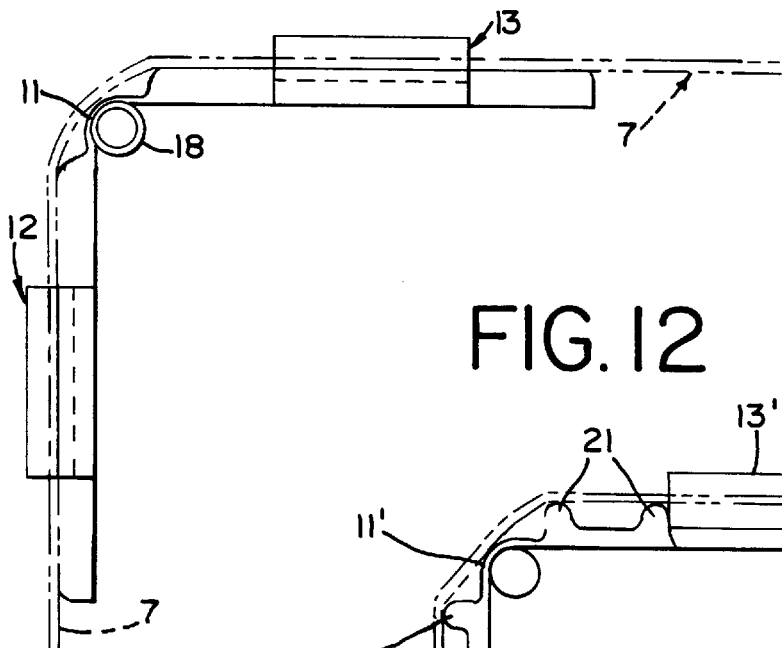
FIG. 6 is a side elevational view showing the condition of the shield of FIG. 1–5 in use in association with a lading tie-down strap.

In FIG. 6, the manner in which the live hinge 11 of the shield 10 forms around the contour of a tube 18 is shown with a tie-down strap 7 being indicated in broken line. The thinness of the live hinge 11 is such as to allow it to readily have interengagement with a substantial portion of the arcuate surface of the pipe 18 as shown in FIG. 6.

Figure 12:
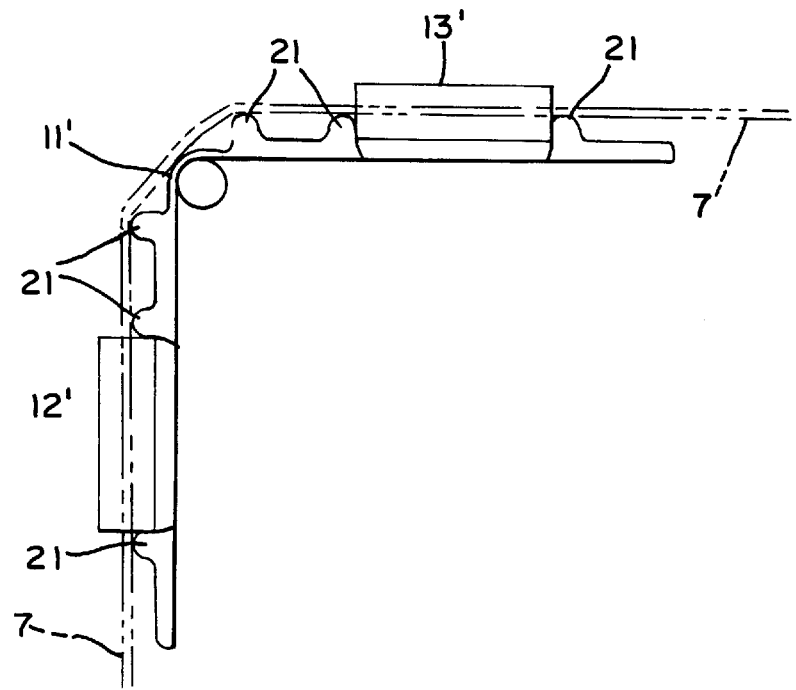
FIG. 12 is a side elevational view illustrating the condition of the shield of FIG. 7 in use.

In FIGS. 7–12 a shield for a tie-down strap is indicated generally at 20 which is generally similar to the shield 10 shown in FIGS. 1–6. The elements of the shield 20 which correspond to the elements of shield 10 are indicated in FIGS. 7–12 by corresponding primed reference numerals. The shield 20 differs mainly from shield 10 in that it is formed with integral transverse ribs 21—21 which add rigidity to the shield in the transverse direction without interfering with its flexibility in the longitudinal direction. The ribs 21 allow the shield 20 to be injection molded or otherwise formed from polyurethane or other suitable plastics with a thinner cross section than that of the shield 10. It will be understood that in use the shields 20 are manipulated in the same manner as the shields 10 as illustrated in FIG. 12.

In FIGS. 13–18, a shield for a tie-down strap is indicated generally at 25 which is generally similar to shields 10 and 20. The shield 25 is divided into upper and lower portions indicated generally at 26 and 27 respectively which are integrally interconnected by a transverse thin live hinge section 28. The upper and lower portions 26 and 27 are provided with corresponding waffle-like formations indicated generally at 30—30 and 31—31. It will be seen that the waffle formations 30 and 31 provide transversely extending ribs 32—32.

The upper portion 26 of the shield 25 has an integrally molded raised flap indicated generally at 33 while the lower portion 27 has an integrally formed raised flap 34.

As viewed in the drawings, the flap 33 is integrally hinged on the left side with a hook formation 35 on its distal end while the flap 34 is hinged on its right end with a hook formation 36 on its distal end. The hooks 33 and 34 are provided with exterior tapered ribs 37—37 and 38—38, respectively. These tapered ribs 37 and 38 impart rigidity to the flaps 33 and 34, respectively.

The shield 25 may be readily molded from a suitable plastic such as polyurethane. The somewhat more elaborate configuration of the shield 25 in comparison with the shields 10 and 20 provide a more efficient utilization of the plastic material while providing enhanced functional characteristics to the shield.

What is claimed is:

1. A shield for adjustable attachment to and removal from a lading tie-down strap and for shielding the strap from wearing engagement with a variably shaped corner of a body of lading ranging in shape from a sharp corner edge to an arcuate or rounded corner surface of appreciable arcuate length, comprising a generally rectangular semi-rigid pad formed intermediate opposite ends with a transverse rectangular live hinge area of appreciable width interconnecting the opposite end portions of said pad and being sufficiently flexible to conform to the contour of a said variably shaped lading corner, and each said end portion having integrally formed with said pad a strap retention formation in the form of a transversely extending raised flap, each said flap is integrally hinged at one end to said pad and has an integrally formed hook on the underside of its distal end open toward its proximal end, said flaps being hinged on opposite sides of said pad whereby a lading tie-down strap may be inserted under said flaps with each lateral edge engaged into one of said hooks.

2. A shield as called for in claim 1 formed of a plastic.

3. A shield as called for in claim 2 formed of polyurethane.

4. A shield as called for in claim 1 wherein said flaps are generally rectangular.

5. A shield as called for in claim 4 wherein said pad has open window areas underneath said flaps.

6. A shield as called for in claim 1 having a plurality of reinforcing ribs extending transversely across said pad.

7. A shield as called for in claim 6 wherein a pair of said ribs are located on opposite sides of each said flap and a third pair are located on opposite sides of said hinge area.

8. A shield as called for in claim 6 wherein a pair of said ribs are located adjacent each side of a respective said flap, with each said pair of ribs interconnected at their opposite ends and at intermediate locations by integral cross connections.

9. A shield as called for in claim 4 wherein each said flap has at least one exterior rib extending between its opposite ends.

10. A shield as called for in claim 9 wherein each of said exterior ribs is progressively tapered from a thick section adjacent the proximal end of a said flap to a thin section adjacent the distal end of said flap.

* * * * *